US007085828B2

(12) United States Patent
Cepulis

(10) Patent No.: US 7,085,828 B2
(45) Date of Patent: Aug. 1, 2006

(54) METHOD FOR VIEWING, MANAGING AND CONTROLLING SYSTEM SPECIFIC HARDWARE USING INDUSTRY STANDARD TABLES UPLOADED TO LOCALLY INSTALLED REMOTE MANAGEMENT DEVICES

(75) Inventor: Darren J. Cepulis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 10/014,943

(22) Filed: Oct. 26, 2001

(65) Prior Publication Data

US 2003/0084137 A1 May 1, 2003

(51) Int. Cl.
G06F 15/173 (2006.01)
G06F 15/177 (2006.01)
(52) U.S. Cl. .......................... 709/223; 709/224; 713/2
(58) Field of Classification Search ................ 709/218, 709/226, 228, 232, 222–224; 713/1–2
See application file for complete search history.

(56) References Cited

U.S. PATENT DOCUMENTS

| 5,109,484 A * | 4/1992 | Hughes et al. ............... 709/222 |
| 6,032,256 A * | 2/2000 | Bernard ....................... 713/200 |
| 6,112,303 A * | 8/2000 | Stancil .......................... 713/2 |
| 6,256,732 B1 * | 7/2001 | Cromer et al. ................. 713/2 |
| 6,269,371 B1 * | 7/2001 | Ohnishi ....................... 707/10 |
| 6,327,660 B1 * | 12/2001 | Patel .......................... 713/193 |
| 6,405,309 B1 * | 6/2002 | Cheng et al. .................. 713/1 |
| 6,470,399 B1 * | 10/2002 | Tasler .......................... 710/16 |
| 6,477,648 B1 * | 11/2002 | Schell et al. ................ 713/200 |
| 6,519,698 B1 * | 2/2003 | Leyda et al. ................... 713/2 |
| 2001/0042202 A1 * | 11/2001 | Horvath et al. ............. 713/154 |
| 2002/0065872 A1 * | 5/2002 | Genske et al. ............. 709/202 |
| 2002/0065909 A1 * | 5/2002 | Han .......................... 709/224 |

* cited by examiner

Primary Examiner—Krisna Lim
Assistant Examiner—Yasin Barqadle

(57) ABSTRACT

A separate device or subsystem which contains its own processor is coupled to a host computer system and operates using specific information stored in the host system. The separate device, which may be management logic, requests the host system-specific information from the host system prior to run-time (e.g., during POST). The requested information is generally information in the form of industry standard tables that are present in the host system and used by the operating system. In addition, the separate device may have a battery to keep it operational even when the host system is non-operational. Because the separate device has information about its host, such information can be provided to external devices even when the host system is non-operational.

27 Claims, 1 Drawing Sheet

METHOD FOR VIEWING, MANAGING AND CONTROLLING SYSTEM SPECIFIC HARDWARE USING INDUSTRY STANDARD TABLES UPLOADED TO LOCALLY INSTALLED REMOTE MANAGEMENT DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates controlling a computer system. More particularly, the present invention relates to uploading configuration and control tables to remote management hardware in a computer system.

2. Background of the Invention

It is becoming increasingly more common today to incorporate some sort of management hardware into server computers. Such management hardware may take the form of a card or embedded logic. In either case, the management hardware provides an external to connection to other servers and possibly other devices, such as power supplies, control modules, and the like. The management hardware generally provides a number of functions such as power management, system configuration and remote system management.

In order for the management hardware to perform some or all of its functions, it generally must know certain specific information about the computer system in which it resides. Examples of such system specific information include, without limitation, the type and number of central processing units ("CPUs"), interrupts, power management capabilities, and the types of disk drives present in the computer. Such information resides within the computer itself, such as in memory. One previous way for the management hardware to obtain the needed information was for the computer to have one or more drivers, i.e., specialized programs, that, upon request from the management hardware, provided the requested information to the management hardware. This process typically occurred during run-time thereby reducing the ability of the computer to perform other valuable tasks and impairing performance. Also, these drivers needed to be developed and maintained for each new server platform and the functionality of the management hardware was very limited.

Accordingly, a better mechanism is needed to provide the necessary system-specific information to management hardware that resides in or with a computer.

BRIEF SUMMARY OF THE INVENTION

The problems noted above are solved by a host computer system coupled to a separate device or subsystem which contains its own processor and operates using specific information stored in the host system. The separate device, which may be a management logic unit, requests the host system-specific information from the host system prior to run-time (e.g., during power on self test). The requested information is preferably information in the form of industry standard tables that are present in the host system and normally used by the operating system.

In addition, the separate device may have a battery to keep it operational even when the host system is non-operational. Because the separate device has information about its host, such information can be provided to external devices even when the host system is non-operational.

These and other features and benefits will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a given component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device "couples" to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

The problems noted above are solved by permitting a device or subsystem coupled to a host computer system to be able to obtain needed information from the host computer during the boot process. The information so obtained can be used by the device to perform various tasks. This concept will be described in greater detail below with regard to FIGS. 1 and 2.

Figure 1:
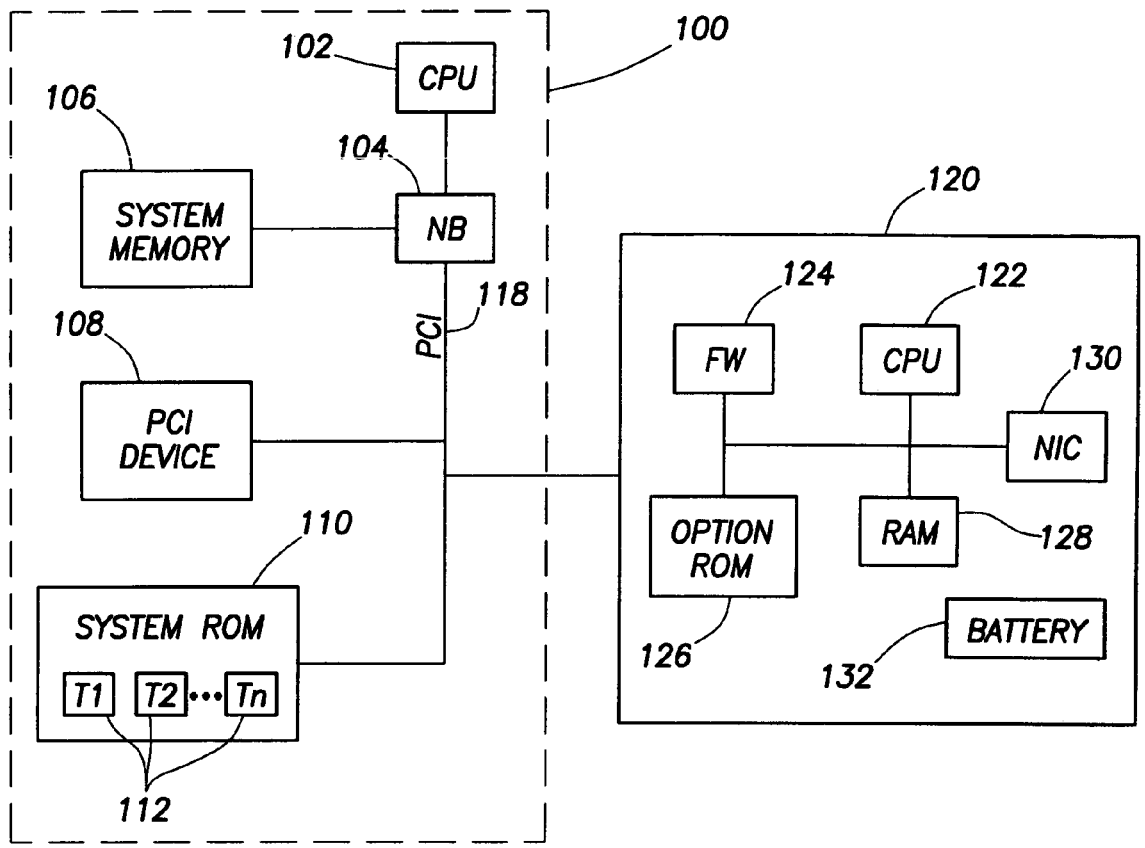
FIG. 1 depicts a block diagram of a computer system constructed in accordance with the preferred embodiment.

Referring to FIG. 1, host computer system 100 is shown and may function as a server or other type of computer. As shown, computer system 100 preferably includes one or more central processing units 102, a north bridge device 104, system memory 106, and one or more devices 108 and 110 coupled to the bridge 104 over a common bus 118. The bus may comprise a peripheral component interconnect ("PCI") bus and, as such, devices 108 and 110 preferably are PCI-compliant. Alternatively, bus 116 may be in accordance with other bus standards and devices 108 and 110 would be compliant with whatever standard is used for the implementation bus 118. PCI device 108 may be whatever type of device is desired, such as a modem, a network interface card ("NIC"), and the like. The specific architecture shown in FIG. 1 is exemplary only and should in no way limit the scope of this disclosure or the claims which follow.

PCI device 110 preferably comprises a non-volatile memory such as a system Read Only Memory ("ROM"). The system ROM 110 preferably includes various executable routines and information. These routines can be executed out of the ROM 110 itself or copied to system memory 106 for execution therefrom. The system ROM code is used for several purposes. One such purpose is to provide the CPU 102 the ability to control various low level activities such as access to the hard disk drives, CD ROM drives, keyboards, mouse, and floppy disk drives (not shown). An additional function performed by the system ROM code in the host computer is to provide a mechanism to configure the system, e.g., to set the type of keyboard, language and other sorts of configuration parameters. Further, the operating system (not specifically shown) which is executed by the host CPU 102 typically makes use of certain types of system-specific information to perform various tasks such as power management and the like. Accordingly, the system ROM code provides such information to the operating system. In accordance with the preferred embodiment of the invention, the system ROM 110 includes one or more information tables 112 labeled as T1, T2, . . . Tn. These tables may be copied to a volatile memory such as system memory 106 for access therefrom or may remain in ROM 100. The tables 112 may include various industry standard sets of information now known or later developed. Examples of such information may include an Advanced Configuration and Power Interface ("ACPI") table, a system management basic input/output system ("SMBIOS"), and the like. In general, the tables include extensive host-specific information and may be in a form other than a table.

The north bridge 104 couples together the host CPU 102, system memory 106 and the bus 118 (and devices connected thereto). For instance, bridge 104 preferably includes a memory controller function that permits, for example, the CPU 102 and PCI device 108 to access the system memory 106. The system memory preferably comprises any suitable type of random access memory ("RAM") such as synchronous dynamic random access memory ("SDRAM"). The north bridge 104 also provides a mechanism through which the CPU 102 can access and control one or more of the devices coupled to bus 118.

Referring still to FIG. 1, the host system 100 is shown coupled to a separate PCI-compliant device or subsystem 120 which preferably comprises management logic. This logic may take the form of an add-in card or embedded logic on the same circuit board comprising the rest of the computer system 100. Further, the management logic may be operated from "auxiliary" power which is always available even if the host is powered off as long as the system is connected to AC power. As shown, the management logic 120 preferably includes its own local CPU 122 as well as firmware 124, option ROM 126, random access memory ("RAM") 128, a network interface card ("NIC") 130 and, optionally, a battery 132. Any one of a variety of architectures can be used to couple together the various components shown. Further, one or more of the components may be fabricated as part of the same physical device. For example, the CPU 122 may include its own RAM memory 128. Further, the logic 120 need not comprise management logic. Instead, the logic 120 can perform any function desired. It is generally intended that logic 120 is a device or subsystem separate from the host 100 that includes its own processing capability and, although it interacts with the host system 100, functions largely separate from the host.

The option ROM 126 preferably contains code that can be accessed and executed by the local CPU 122. This code performs a variety of functions in accordance with the functions performed by the management logic as noted above. One such function, however, is to provide the management logic with the system-specific information it needs to function correctly. To this end, the management logic 120 uploads at least the information it needs from the host system preferably before run-time (e.g., during the power on self test ("POST") process). The needed information is generally contained in the tables 112 that the computer's operating system uses as described above. Thus, preferably one or more of the tables 112 are uploaded into the management logic's RAM memory 128 for subsequent use by the management logic. The tables 112 can be uploaded using one of at least two techniques.

Figure 2:
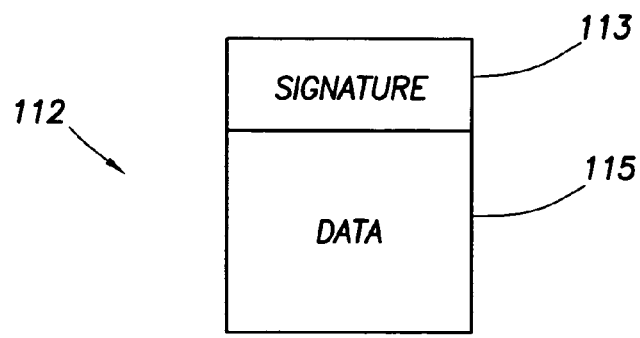
FIG. 2 shows an exemplary table having host-specific information and a signature which a separater device uses to detect the tables present in the host system for subsequent download to the device.

In accordance with the first technique, the option ROM code searches for a copy of the tables from the system's addressable memory space and, upon finding a desired table, copies the table to RAM 128. The tables can generally be identified by a signature which is shown in FIG. 2. An exemplary table 112 includes a signature 113 that preferably precedes a data set 115 which contains system-specific information. The signature can be any predetermined value or character string and generally is defined in the specification associated with the table (e.g., ACPI specification). The option ROM code searches for these signatures and, upon locating one, requests the host CPU 102 to transfer a copy of the table 112 to the management logic's RAM 128. The host CPU 102 then executes code to coordinate the transfer of the table from host system memory 106 to memory 128 in the management logic 120 via a block move type of instruction. If desired, the option ROM code may request some or all of the tables 112 to be uploaded to management logic 120.

In accordance with the second technique, the management logic 120 becomes a master of the PCI bus 118 in accordance with the conventional PCI bus mastership protocol. Once a master of the bus, the management logic 120 runs a cycle on the bus 118 to read the desired table from memory 106. This technique does not necessarily require the host CPU 102 to do anything.

As shown in FIG. 1, the management logic 120 may include a battery 132 and, as such, can be operational, at least to a certain extent even though the host system is turned off or placed in a reduced power state. Because the management hardware has obtained the host system-specific information before run-time begins, such information is readily available even if the host system is off or otherwise non-operational. This permits the computer 100 to be contacted via the management hardware to view or control various system-specific parameters. For example, an external device, such as another server, might want to know whether server 100 is present, what type of server it is, the number of processors server 100 contains, etc. Management logic 120 can provide this type of information on behalf of the server 100. It may also want to power cycle server 100.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a host computer including a CPU coupled to memory, wherein the memory stores host-specific information; and
   a management device coupled to said host, wherein a copy of said host-specific information is transferred from the memory to the management device during a boot process of the host computer and wherein, if a network device later sends a request to the host computer, the management device provides a response to the network device based on the host-specific information stored in the management device.

2. The computer system of claim 1 wherein said memory comprises non-volatile memory.

3. The computer system of claim 2 wherein said memory comprises volatile memory.

4. The computer system of claim 1 wherein said management device comprises a subsystem of the host computer.

5. The computer system of claim 4 wherein the host specific information includes a signature which identifies the information whereby the management device locates and transfers said host specific information.

6. The computer system of claim 1 wherein said management device includes a CPU that uses the host specific information to control a function for the host computer.

7. The computer system of claim 1 wherein the management device uploads the host specific information during a power on self test of the host computer.

8. The computer system of claim 4 wherein said management device uses said host specific information to provide management functionality for the host computer when the host computer is in a law power state.

9. The computer system of claim 8 wherein the host specific information includes a signature which identifies the information and said management device searches for said signature to find said host specific information.

10. The computer system of claim 8 wherein said management device includes a CPU.

11. The computer system of claim 8 wherein said management device operates from an auxiliary power source that is available even if the host computer is off.

12. The computer system of claim 8 wherein the management device uploads the host specific information during power on self test of the host.

13. A logic unit sub-system, comprising:
    a CPU; and
    memory coupled to said CPU;
    wherein said logic unit sub-system is adapted to couple to a host computer system and store a table containing host computer information in the memory,
    wherein the table is transferred from the host computer system and stored in the memory during a power on self test of the host computer system, and
    wherein the logic unit sub-system later uses the table to respond to network requests for information on behalf of the host computer system.

14. The logic unit sub-system of claim 13 wherein said logic unit sub-system comprises management logic which responds to network requests for information on behalf of the host computer system when the host computer is in a low power state.

15. The logic unit sub-system of claim 14 wherein the host computer information includes a signature which identifies the information and said logic unit sub-system searches for said signature to find said table containing host computer information.

16. The logic unit sub-system of claim 15 wherein the logic unit sub-system is configured to request a CPU in the host computer system to coordinate the transfer of the table to the logic unit sub-system.

17. The logic unit sub-system of claim 15 wherein the logic unit sub-system uploads the table without the involvement of a CPU of the host computer system.

18. The logic unit sub-system of claim 13 wherein the logic unit sub-system uploads the table during a power on self test event as a subsystem of the host computer.

19. The logic unit sub-system of claim 13 wherein said logic unit sub-system operates from a different power source than the host computer system and said logic unit can be powered on even if the host computer system is powered off.

20. A method of operating a logic unit coupled to a host computer, comprising:
    searching for host computer specific information during a boot process of the host computer;
    upon finding said information, storing said information in a memory of the logic unit; and
    using the information stored in memory to independently respond to network requests for information on behalf of the host computer;
    wherein said searching and storing occur before run-time of the host computer.

21. The method of claim 20 wherein searching and storing before run-time allows a CPU of the host computer to operate without interruption from the logic unit during run-time.

22. The method of claim 20 wherein storing the computer specific information in a memory of the logic unit comprises storing at least one of an Advanced Configuration and Power interface ("ACPI") table and a system management basic input/output system ("SMBIOS").

23. A system, comprising:
    a host computer that has a central processing unit ("CPU") coupled to a peripheral interface and a memory unit that stores an information table;
    a management unit coupled to the peripheral interface of the host computer, the management unit accesses and stores the information table during a boot process of the host computer and
    a network device coupled to the management unit;
    wherein, if the network device sends a request to the host computer, the management unit is operable to respond to the request using the information table stored in the management unit.

24. The system of claim 23 wherein the management unit comprises a battery power supply such that the management unit is operable when the host computer is in a low power state.

25. The system of claim 23 wherein the management unit comprises:
    a ROM memory that stores computer readable instructions for accessing and storing the information table; and
    a processor that executes the computer readable instructions.

26. The system of claim 25 wherein the processor requests the CPU to transfer a copy of the information table to a memory of the management unit.

27. The system of claim 25 wherein management logic of the management unit is configured to control the host computer's peripheral interface and is operable to read the information table from the host computer's memory unit such that the CPU is not needed to access and store the information table.

* * * * *

UNITED STATES PATENT AND TRADEMARK OFFICE
CERTIFICATE OF CORRECTION

PATENT NO. : 7,085,828 B2
APPLICATION NO. : 10/014943
DATED : August 1, 2006
INVENTOR(S) : Darren J. Cepulis It is certified that error appears in the above-identified patent and that said Letters Patent is hereby corrected as shown below:

In column 5, line 32, in Claim 8, delete "law" and insert -- low --, therefor.

In column 6, line 20, in Claim 20, after "stored in" insert -- said --.

In column 6, line 32, in Claim 22, delete "interface" and insert -- Interface --, therefor.

In column 6, line 40, in Claim 23, after "computer" insert -- ; --.

Signed and Sealed this

Thirty-first Day of March, 2009

JOHN DOLL
*Acting Director of the United States Patent and Trademark Office*